March 6, 1945.   H. C. MARKS   2,370,871
CHLORINE DETECTION BY ELECTRODE DEPOLARIZATION
Filed Feb. 7, 1942   2 Sheets-Sheet 2
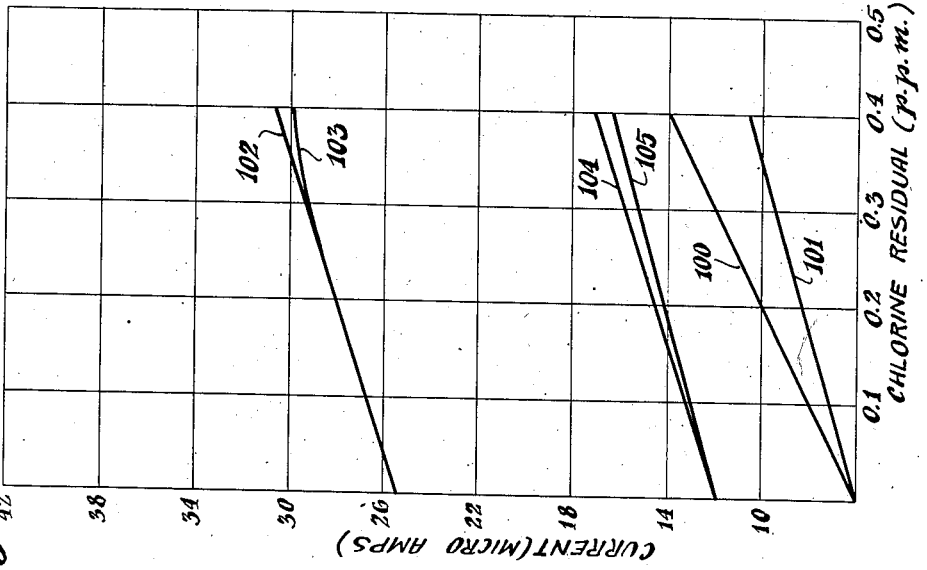
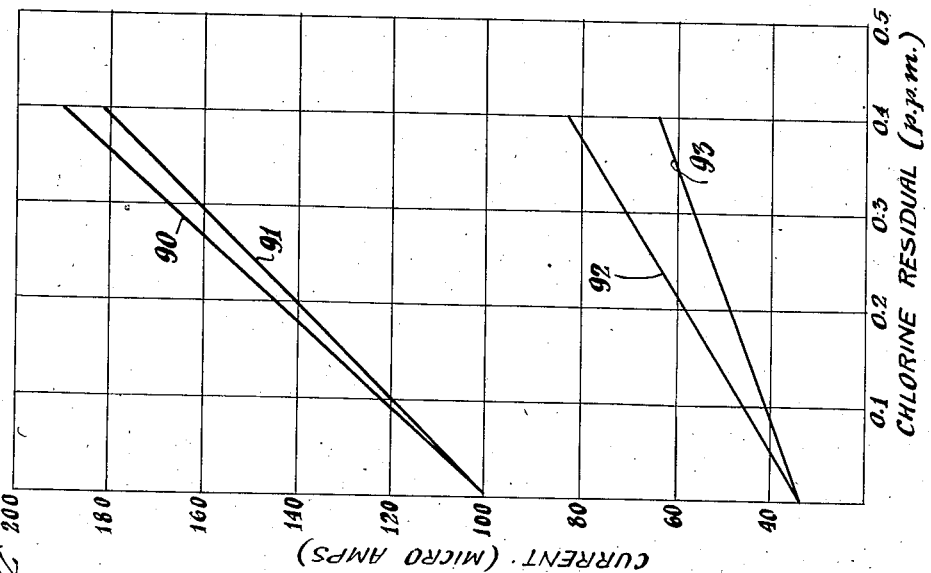
INVENTOR.
Henry Clay Marks
BY
John C. Kerr
ATTORNEY Patented Mar. 6, 1945

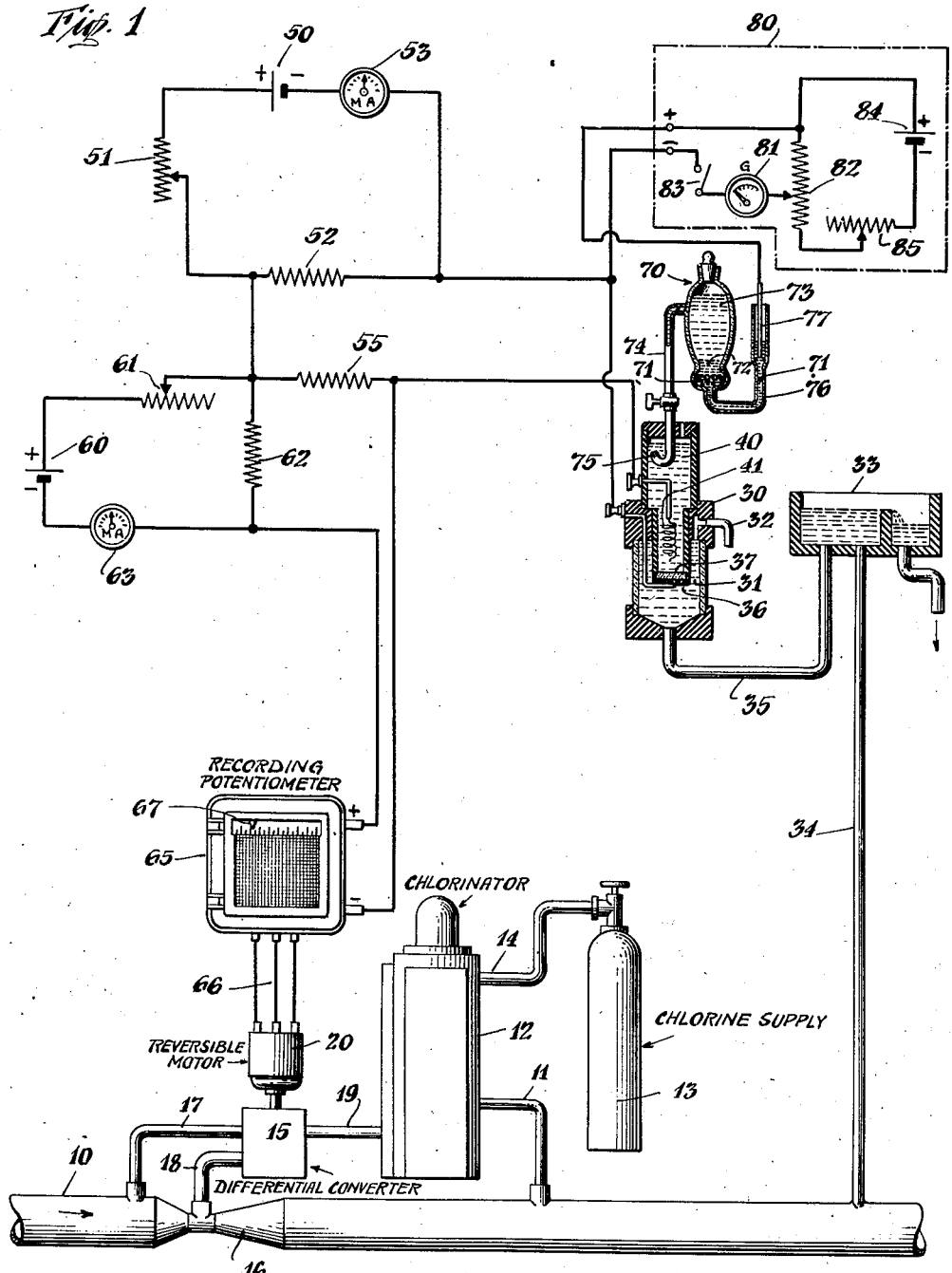

2,370,871

UNITED STATES PATENT OFFICE 2,370,871

CHLORINE DETECTION BY ELECTRODE DEPOLARIZATION

Henry Clay Marks, Bloomfield, N. J., assignor to Wallace & Tiernan Products, Inc., Belleville, N. J., a corporation of New Jersey Application February 7, 1942, Serial No. 429,934

5 Claims. (Cl. 204—1)

An advantageous procedure for detecting the content of oxidizing or reducing substances in a liquid is the so-called depolarization method, wherein the chemical determination is effected by measurements or tests of the depolarization produced by the liquid upon at least one electrode exposed thereto. For example, certain fundamental procedures of that sort and certain improvements therein are embraced respectively in the co-pending application of Charles F. Wallace, Serial No. 290,842, filed August 18, 1939, now Patent No. 2,350,378, issued June 6, 1944, for Methods and systems of apparatus for detecting and controlling changes in composition of liquids, and in my co-pending application Serial No. 412,316 filed September 25, 1941, for Detection of oxidizing or reducing substances by electrode depolarization.

Such procedures find important application in the measurement or control of the content of active chlorine (an oxidizing agent) in aqueous liquids, such as drinking water or other water supply systems, sewage, and the like, which may have been treated with chlorine (or equivalent chlorine-releasing material) for purification or analogous purposes. In such case, for example, an external, unidirectional, polarizing E. M. F. may be applied across electrodes of which at least the cathode is exposed to the liquid under test, the other electrode being either exposed to the liquid or otherwise in electrolytic contact therewith as through an electrolytic medium of constant composition, and the current through the resulting cell, or changes in such current, may be detected as representing the chlorine content (or changes therein) of the liquid, the amount of current being generally determined by the extent of depolarization produced by the chlorine at the otherwise polarized cathode.

In that and other electrical systems for determining active chlorine concentration, difficulty is sometimes encountered by reason of other substances in the liquid under test. In the chlorination of water and sewage, for example, a class of material which has now been found to be most likely to cause such interference is what may be conveniently termed ammonia type material, viz. ammonia and ammonia type compounds such as amines, amides, amino acids, and the like. Chlorine reacts or tends to react with compounds of that class, to form chloramines, and although the latter still present the chlorine in an active or "available" state—i. e. available for the intended purification or like oxidizing purpose—it has also now been found that chloramines are frequently not measured with accuracy in many heretofore known methods of chlorine detection. For instance, where a simple depolarization system is used for detection of active chlorine and where ammonia type material may be present in the liquid under test at least part of the time, the readings frequently fail to afford proper representation of the actual available chlorine content.

Accordingly, an important object of the present invention is to provide procedure, which may be of a relatively simple and yet reliable sort, whereby true determinations of active chlorine in an aqueous liquid may be had by detection of the depolarization produced at a polarized cathode exposed to the liquid, without adverse effect by extraneous substances, for example, the ammonia type materials. To those and other ends, I have now discovered that by maintaining the electrical potential of the cathode at a value within a range which I have found to be quite critical, the resulting readings of depolarization may be taken as representing the total available chlorine content of the liquid, whether as chloramines or otherwise (e. g. as hypochlorous acid or other usual form of chlorine), to a reasonably good degree of accuracy. This critical range, according to my discovery, is from about $-0.075$ to about $-0.2$ volt relative to the saturated calomel electrode; it being understood that the stated range of values is for the potential of the cathode itself (the terms "cathode potential" and "the potential of the cathode" as used throughout this application are intended to mean the potential of a cell formed by the polarized cathode, the cell electrolyte and a saturated calomel electrode in electrolytic contact therewith) rather than the voltage applied across the cell, which according to my further discovery is but one of the factors determining the cathode potential.

I have also found that optimum results, involving practically complete freedom from interference by reason of substances ordinarily occurring or likely to occur (according to present experience) in water supply and sewage treatment systems, are achieved by maintaining the cathode at a potential in the critical range extending from about $-0.1$ to about $-0.15$ volt relative to the saturated calomel electrode. Upon operating the system with the cathode potential in the preferred optimum range, the effect of ammonia type materials is remarkably obviated, in sharp contradistinction to many prior chlorine-sensitive systems, wherein the conversion or apparent conversion of part or all of the chlorine into chloramines has resulted in a zero reading of chlorine content or at least an insufficient or otherwise false determination.

According to my investigations and present understanding, the depolarization method of chlorine detection depends on cathodic reduction of active chlorine, and the possibility of measurable depolarization is determined by the relation of the oxidizing intensity of the substance under measurement (i. e. chlorine), to the reducing intensity of the cathode, the relative electric potential of the latter being a measure of its reducing intensity. Although active chlorine is considered a powerful oxidizing agent, I have observed that when it is in the form of chloramines, it is much more difficult to reduce in an electrical cell of this type, and therefore requires a more negative cathode potential than would otherwise be deemed sufficient and consequently used in accordance with theoretical considerations heretofore recognized. For instance, it is even possible to have a cathode potential such that a test of water containing active chlorine uncombined with an ammonia type substance causes a large increase in cell current (due to the depolarization produced by the chlorine), and yet such that repetition of the test with the same concentration of active chlorine combined as chloramines yields no measurable effect on the current, i. e. affords no determinable depolarization by reason of the chlorine so combined. I have found, however, that if the cathode potential is made sufficiently negative, at least specifically more negative than about —0.075 volt relative to the saturated calomel electrode, the system will respond to chloramines, and at the same time will respond accurately to active chlorine in its other customary forms.

On the other hand and likewise according to my discovery and present understanding, the cathode potential cannot satisfactorily be made more negative than about —0.2 volt (relative to the saturated calomel electrode), especially because of the practical difficulty that some dissolved oxygen is normally present in the water under test. If the cathode potential is made too negative, dissolved oxygen can be reduced at the cathode, thereby increasing the depolarization and the resulting current flow so as to yield a false reading of chlorine content. For example, in drinking water the dissolved oxygen concentration is usually about fifty times the concentration of active chlorine present as a result of the ordinarily preferred operation of the purifying system. In such case, with an extremely negative cathode potential the depolarization cell would read the dissolved oxygen concentration almost exclusively, and the response would bear no useful relation to the chlorine content.

By way of illustration, the annexed drawings show one example of a chlorine detection and control system embodying arrangements for measuring cathode potential so as to provide for operation in accordance with the invention, and also show graphically certain results obtained by operation under certain specific conditions taken by way of example. More specifically, in the drawings:

Fig. 1 is a generally diagrammatic view of one advantageous form of such system; and Figs. 2 and 3 are graphical notations of operations of the system under certain representative conditions.

Although the procedure of the invention may be applied simply for indicating or recording the chlorine content of an aqueous liquid, or for any of a variety of control or testing purposes, Fig. 1 conveniently illustrates, by way of example, a system arranged for automatic control of the application of chlorine to a flowing liquid such as water or sewage, in accordance with the residual chlorine content of the liquid after treatment, e. g. to maintain a predetermined concentration of residual chlorine. Being accurately sensitive to extremely small quantities of available chlorine, the procedure is particularly useful for public health installations, in which it is usually desired to maintain a very small quantity of residual or available chlorine, ordinarily measured in parts per million or fractions thereof, in the water, sewage or the like after treatment.

Referring to Fig. 1, the liquid to be tested or controlled may, for instance, consist of water flowing through a conduit 10 to which chlorine is subsequently added, in predetermined or determinable amount, through the conduit 11 by means of a chlorine feeding device 12 which may, for example, be of the type described in United States Patent No. 1,777,987, issued October 7, 1930, to Charles F. Wallace. It will be understood that a supply of chlorine gas under pressure is contained in the cylinder 13 and fed to the chlorinator 12 through the pipe or tubing 14.

In ordinary cases, the flow of liquid through the conduit 10 may vary, for instance in accordance with the consumption or the requirements of use, and it is usually desirable to maintain at least a certain degree of proportionality between the flow of chlorine gas or solution through the pipe 11 and the flow of liquid through the conduit 10. For purposes of illustration a suitable device to accomplish such proportionality may be a differential converter generally designated 15, such as described in United States Patent No. 1,762,706, issued June 10, 1930, to Charles F. Wallace. The differential converter 15 is operated by a venturi meter 16 which creates a pressure differential that is conveyed to pressure sensitive elements (not shown) in the converter 15 by means of suitable pipes 17 and 18. As will be apparent from the cited Patent No. 1,762,706, the converter 15 produces a controlling vacuum which varies in accordance with variations in flow through the main 10, and which is transmitted to the vacuum type chlorinator 12, for control thereof, by means of the pipe 19.

The apparatus of the cited Patent No. 1,762,706 includes adjusting means for varying the ratio between the supply of chlorine and the rate of flow of the water or the like to which the chlorine is added; such adjusting means, comprising, for instance, the adjustable orifice 26 shown in Figs. 1 and 5 of the patent. Where the present invention is to be employed for automatically regulating the feed of chlorine to maintain a substantially constant or predetermined condition in the water treated, suitable means such as the reversible motor 20 may be provided to effect the desired adjustment, as by operating the stated adjustable orifice of the differential converter 15. Although other arrangements may be employed whereby a device such as the motor 20 is adapted to adjust the rate of chlorine supply or the ratio between such rate and the rate of flow of water (for example where Pitot tubes as in Fig. 6 of the patent are used instead of a venturi, the pressure differential may be too small for feasible use of an adjustable orifice, and the motor may then be arranged to adjust the position of fulcrum 17 in Fig. 6 of the cited patent, or to adjust a valve in the chlorinator such as the valve 140 in Fig. 2 of the other cited Patent No. 1,777,987), the adjustment of the orifice in the converter apparatus shown is a convenient arrangement and is therefore specifically described for purposes of illustration.

Although in some cases other types of electrode and cell structures may be used, for example as disclosed in the aforesaid patent of Charles F. Wallace, No. 2,350,378, I at present prefer to employ structure of the type disclosed and claimed in my co-pending application Serial No. 390,074, filed April 24, 1941, for Electrical cell apparatus, to respond electrically to changes in chlorine content of the liquid in the main 10. Reference being conveniently had to my said application Serial No. 390,074 for a more detailed description of the cell structure, the apparatus of Fig. 1 may include, for example, a depolarization cell 30 having a chamber 31 with an overflow outlet 32. Water from the main 10 may be continuously withdrawn to a constant level box 33 by the conduit 34, and thence passed at a constant rate of flow through the conduit 35 to the chamber 31. The flow of water from the conduit 35 may be conveniently jetted against the lower surface of a thin electrode plate 36, and if desired, means (not shown) may be provided for entraining abrasive particles in the liquid for cleaning and other purposes at the electrode surface, as disclosed in the aforesaid Wallace patent No. 2,350,378 and my aforesaid application Serial No. 390,074.

The electrode 36 is conveniently perforated with a multiplicity of small holes and is disposed against a porous diaphragm 37, of porous porcelain or other suitable material, which separates the chamber 31 from an upper chamber 40 but permits electrical association of the respective liquids in the chambers, as by diffusion. The upper chamber 40 conveniently contains an electrolytic medium of constant composition, such as a suitable acid or salt solution, for example a saturated aqueous solution of potassium chloride. A suitable electrode such as the coil of wire 41 is exposed to the liquid in chamber 40, to provide an anode for the cell; it being understood that the electrode 36, exposed to the liquid under test, is the cathode.

With this arrangement, as more fully explained and as claimed in my said application Serial No. 390,074 and in my further application Serial No. 412,316, filed September 25, 1941, the cathode alone is exposed to the liquid under test, and undesirable effects of the latter on the anode are avoided; moreover, the electrical path through the liquid under test between the electrodes is reduced to a minimum, thus practically obviating, for instance, undesirable effects of changes in conductivity of the liquid under test. In some cases, as where the electrode 36 is of material subject to chemical attack by the electrolyte in chamber 40 (for example, copper) a thin sheet or layer of similarly perforated insulation (not shown) may be included between the cathode 36 and the porous diaphragm 37. Generally speaking the electrodes may be constructed metals such for example as platinum, gold, copper, mercury or the like, but subject to appropriate correlation of the electrode materials, particularly that of the anode, with the applied voltage, as explained hereinbelow and as may be readily ascertained by means of the supplemental testing instrumentalities likewise hereinbelow described.

The system comprises means for applying a polarizing voltage across the electrodes 36, 41 of the cell, together with means converting the depolarization current through the cell into a suitable potential drop, and means for detecting the resulting potential drop, or its changes due to changes in the composition of the liquid traversing the cell. For application of the preferred constant or substantially constant voltage across the electrodes, the system may include a suitable voltage source 50, such as a dry cell having an E. M. F. of 1.5 volts, which is connected in circuit with a regulating rheostat 51, a dropping resistor 52 and for facilitation of adjustments, a milliammeter 53 (current in this circuit being of the order of 10 milliamperes.) The voltage appearing across the resistor 52 is applied across the electrodes 36, 41 through a dropping resistor 55, as shown. The voltage thus applied to the cell may be adjusted with the rheostat 51.

A further circuit comprising the battery or cell 60 (similarly a dry cell of 1.5 volts), rheostat 61, dropping resistor 62 and milliammeter 63, is included to provide a biasing voltage across the resistor 62. The latter is connected in series with the resistor 55 to the input of a voltage-sensitive translating device, such as the recording potentiometer generally designated 65. Although any of a variety of other sensitive means may be employed for detecting or otherwise translating changes in current produced by changes in depolarization of the cathode 36, the illustrated circuit has been found advantageous, converting cell current changes into voltage changes to the input of the self-balancing potentiometric recorder 65, which is adapted to indicate and record the voltage (and changes therein) at its input, and includes the usual means (not shown) for maintaining balance of its internal electrical circuit.

The biasing voltage produced across the resistor 62 may be placed in either an opposite or an additive relationship (depending upon the polarity of the battery 60) to the voltage produced across the resistance 55, so that means are provided for biasing the indicator or pen arm 67 of the meter to any desired position. In the circuit shown, with a recording potentiometer having a range of 10 millivolts full scale, and with other circuit components as elsewhere herein described, the resistors are connected for opposition of their voltages. The potentiometer 65 may also have control contact arrangements (not shown) which are usual in such meters and which are adapted to operate upon and during unbalance in the meter occasioned by change in the impressed voltage, and which may be arranged to start and stop the reversible motor 20 in either direction (dependent on the direction of voltage change), for chlorine feed regulation as explained hereinabove, by control of circuits including the three conductors 66 between the meter 65 and the motor.

By way of specific example and with the understanding that other circuits and values may be employed to obtain the voltages and other characteristics of the invention, convenient values for a system of the type shown in Fig. 1 are as follows: a total of 200 ohms for the resistor of rheostat 51, 16 ohms for the resistor 52, 100 ohms for the resistor 55, 8 ohms for the resistor 62 and 2000 ohms for the resistance of rheostat 61. Current in the circuit of the cell 60 is of the order of 1 milliampere.

Let it be assumed that rheostat 51 has been adjusted to provide a suitable polarizing voltage across the cell 30 and that water from the main 10 is traversing the cell in contact with its cathode 36 (the sampling of pipe 34 being appropriately taken at a desired point, for example after a predetermined opportunity for reaction of the applied chlorine in the water), and that the system is in balance, for the desired chlorine content in the water. If now the chlorine content changes, the extent of depolarization of the cathode 36 similarly changes and a corresponding change occurs in the current through the dropping resistor 55. The resulting voltage change in the input of the potentiometer causes the arm of the latter to take up a new position and reading, and at the same time, by virtue of the control contacts (not shown) the motor 20 is caused to operate, to the necessary extent and in the necessary direction for adjustment of the chlorine feed to restore the chlorine content of the treated water to the desired value or range, from which it has departed.

In accordance with the present invention, as explained above, the actual potential of the cathode 36 should be maintained at a point within the stated limits, and preferably within the relatively critical optimum range of −0.1 to −0.15 volt, for accurate response to the actual concentration of available chlorine without appreciable effect by the presence of extraneous materials, such as ammonia type compounds which tend to convert the chlorine content into chloramines. For determination of the cathode potential and to permit ready adjustment of the system (as by rheostat 51), the illustrated apparatus includes a reference cell 70, conveniently consisting of a saturated calomel electrode of standard characteristics. Although the cathode potentials are herein referred to such electrode, it will be understood that for the purposes of design or adjustment of a system in which the invention is used, other means or other reference electrodes may be employed in many cases (for instance the standard silver—silver chloride electrode), provided that the potentials herein stated are appropriately modified by known or ascertainable conversion factors for such other reference electrodes or means, as will be at once understood by those familiar with the art. That is to say, although the cathode potential can only be expressed in relation to a reference electrode and the saturated calomel electrode has been chosen for convenience, reference to other electrodes could be as readily made (with appropriate conversion factors) and would be representative of the same actual, absolute potential condition of the cathode.

The calomel electrode 70, of conventional construction, may comprise a glass vessel containing at the bottom a pool of mercury 71 above which is a saturated solution of mercurous chloride 72, the remainder of the space containing a saturated solution of potassium chloride 73. A tube 74 opens into the potassium chloride solution above the level of the mercurous chloride and has its lower end closed by a porous plug 75. When tests are to be made, the cell 70 is disposed so that the lower end of the tube 74 is exposed to the liquid in the upper chamber 40 of the cell 30; and in such event, electrical connection is afforded by diffusion, between the potassium chloride solution of the reference cell 70 and the solution in the chamber 40, through the porous plug 75.

The cell 70 also includes a tube 76 of U-shaped configuration, extending from the bottom of the vessel and containing mercury in communication with that at the bottom of the vessel. A suitable conductor 77 (such as a platinum wire) extends into the mercury in tube 76 to provide an electrical terminal for the reference cell or electrode 70.

To read the cathode potential, the calomel electrode terminal 77 and the cathode 36 may be connected to an appropriately sensitive voltage measuring device, such as the manual potentiometer galvanometer system enclosed in the box 80. This apparatus may be of any type suitable for detecting small voltages without appreciable current drain, and may for example include a galvanometer 81 connected between the variable contact of a slide wire resistor 82, and (through an appropriate switch 83) the cathode 36. The calomel electrode terminal 77 is connected to one end of the resistor of the slide wire device 82, and to provide balancing voltage drop across the last mentioned resistor a suitable voltage source such as the dry or standard cell 84 and the rheostat 85 are connected in series with the resistor.

Assuming that the slide wire device 82, with suitable adjustment of the rheostat 85, is appropriately calibrated for reading voltage in accordance with the position of its variable element, it will be seen that when the switch 83 is closed and the slide wire is then adjusted for null reading of the galvanometer 81, the position of the slide wire represents the potential of the cathode 36. In this way, the cathode potential may be readily determined, even under actual operating conditions, so that it may be maintained at a predetermined value within the desired range in accordance with the present invention. Ordinarily, the cathode potential need only be measured at the outset of operations with a given system—for proper initial adjustment—and at most, only infrequently thereafter, for minor readjustments. Indeed it will be understood that for simplicity of manufacture in quantity, the apparatus may be appropriately pre-designed or pre-adjusted to exhibit the desired cathode potential, without inclusion of any means to test such potential.

I have found that in general, the cathode potential is dependent on the voltage applied across the cell and the material of which the anode is constructed. If the anode has sufficient area and is in contact with a solution of such nature that it is not polarized to any great extent (for example, in the chamber 40, and with a silver anode, a saturated solution or a 2 normal solution of potassium chloride, or of sodium chloride, or a dilute, e. g. normal hydrochloric acid solution), the cathode potential is practically determined by the two factors of anode material and applied E. M. F. For example, if the anode area is substantially larger than that of the cathode, say 8 sq. in. of exposed anode area for 2½ sq. in. of exposed cathode, the anode area has no appreciable effect on the cathode potential; but in other cases the cathode potential may depend on the anode area as compared with the area of the cathode.

Reference is now made to Fig. 2, which shows certain response curves of a cell of the type shown in Fig. 1, as embodied in a circuit such as there illustrated for detecting the depolarization current and for measuring the cathode potential. In Fig. 2, the horizontal coordinate represents the residual chlorine content of the water under test, in parts per million, the actual tests made and recorded in Fig. 2 being with various quantities of chlorine less than one part per million. The vertical coordinate represents the current through the cell in microamperes, as produced by the effect of the chlorine in depolarizing the cathode. These curves represent readings taken with various quantities of residual chlorine in the water tested by the cell 30, and using a silver anode and a copper cathode for the cell.

With the applied voltage adjusted to produce a cathode potential of −0.20 (as measured by means of the sort shown in Fig. 1), the applied voltage, for these electrodes, was found to be 0.20 volt, and curve 90 represents the readings of depolarization current for various values of residual chlorine, with ammonia absent from the water. Under the same circumstances and with the same cathode potential, curve 91 represents similar readings obtained in the presence of small amounts of ammonia. With the cathode potential changed to −0.05—the applied voltage being then 0.04 volt—curve 92 represents readings of depolarization current for chlorine-containing water without ammonia, and curve 93, readings under the same conditions but with small amounts of ammonia present. It will be at once observed that when the cathode potential is as little negative as −0.05, the error caused by the presence of ammonia is much too large for accurate detection of available chlorine; but with a cathode potential of −0.20 (curves 90 and 91) the divergence of readings occasioned by ammonia is relatively small, and for many practical purposes, the system then affords a sufficiently accurate determination of residual chlorine content regardless of the presence of ammonia type material.

Fig. 3 shows further curves, plotted with the same coordinates, representing tests with a cell 30 having a platinum anode and a mercury cathode (suitable arrangement, not shown, being made to support the mercury cathode preferably in proximity to the porous member 37, for example as shown in Fig. 6 of my aforesaid application Serial No. 390,074). Curve 100 represents readings taken in the absence of ammonia, with a cathode potential of −0.01 volt (relative to the saturated calomel electrode), the applied voltage being 1.30 volts, and curve 101 represents readings with ammonia present, under the same conditions. It will be seen that the divergence of the curves is substantial, indicating that accurate chlorine detection cannot be had under such conditions if variable effects of ammonia type material were anticipated. Curves 102 and 104 represent readings in the absence of ammonia, and curves 103 and 105 readings in the presence of ammonia, with electrodes of the materials stated and an applied voltage of 1.40. In the case of curves 102 and 103, the anode was quite large relative to the cathode, and the cathode potential was found to be −0.20 volt. In the case of curves 104 and 105, the anode was substantially smaller than the cathode, and the cathode potential was found to be −0.075 volt. Curves 102 to 105 inclusive thus illustrate the effect of anode area on the cathode potential; and at the same time they show that with a cathode potential of −0.075, very good accuracy of chlorine detection may be had, and with a cathode potential of −0.20, similarly accurate detection, regardless of the presence of ammonia type material. As indicated hereinabove, it is found that with cathode potentials less negative than −0.075, the error due to ammonia is too large for accurate practical results; and at the same time it is not practical or satisfactory to work at cathode potentials more negative than −0.2 volt relative to the saturated calomel electrode, e. g. for the reasons stated hereinabove.

Although the desired optimum cathode potential may be obtained, in any case, by use of a simple testing arrangement such as in Fig. 1, it will also be appreciated that under equilibrium conditions, and assuming the anode area is sufficiently large relative to the cathode, the cathode potential can ordinarily be obtained by simple calculation if the anode material and the impressed voltage are known. That is, the algebraic sum of the anode and cathode potentials, theoretically equals, and in practice approximately does equal, the impressed voltage, and if the anode is not polarized, its potential can be obtained from published values of standard electrode potentials.

By way of further example, the following table lists values of cathode potential (including, for illustration, some that do not embody the invention) observed experimentally with various anodes and various values of impressed voltage, these values being in reasonable agreement with corresponding values obtainable by calculation as explained above. The electrolyte in the anode chamber consisted of a saturated aqueous solution of potassium chloride.

| Anode | Applied voltage | Cathode potential | Cathode |
|---|---|---|---|
| Silver | +0.04 | −0.05 | Copper. |
| Do | +0.10 | −0.13 | Copper or gold. |
| Mercury | +0.20 | −0.16 | Copper. |
| Gold | +0.80 | +0.05 to +0.1 | Gold. |
| Platinum | +1.00 | +0.09 | Platinum. |
| Do | +1.40 | −0.10 to −0.20 | Mercury. |

It will be observed that when the anode is constructed of a noble metal (e. g. gold or platinum), relatively large values of impressed voltage are necessary in order to obtain the cathode potentials desired in accordance with the present invention. For example, with a platinum anode, the impressed voltage is insufficient at 1.0 volt and indeed should be about 1.4 volts. This voltage is above the theoretical decomposition voltage of water, but it is possible, for example, to avoid the difficulty of electrolyzing the water itself (with consequent high current, masking the depolarization effect) by using a cathode material which is known to have a high hydrogen over-voltage, so that even at the high impressed voltage, there is no tendency to electrolyze the water. Thus, for instance, satisfactory results at an impressed voltage of 1.4 have been obtained with a platinum anode and a cathode of mercury, the latter having a sufficiently high overvoltage.

It will be understood that where reference is made in the claims to a test or other examination for chlorine content of a liquid, no restriction is intended as to the type of original chlorinating treatment, whether by addition of chlorine per se or otherwise, for example as hypochlorite.

It is to be understood that the invention is not limited to the specific apparatus or examples set forth herein, but may be carried out in other ways without departure from its spirit as defined by the following claims.

I claim:

1. In the procedure for detecting the available chlorine content of an aqueous liquid by detection of the depolarization of a polarized cathode exposed to the liquid, the improvement by which to detect the sum of hypochlorous and chloramine chlorine, comprising the step of maintaining the cathode at a predetermined potential with respect to an anode in electrolytic contact therewith, such as that the potential between said polarized cathode and a saturated calomel electrode brought into electrolytic contact therewith would be within the range of about 0.075 volt to about 0.2 volt with said cathode as the negative pole.

2. In the procedure for detecting the available chlorine content of an aqueous liquid by detection of the depolarization of a polarized cathode exposed to the liquid, the improvement by which to detect the sum of hypochlorous and chloramine chlorine, comprising the step of maintaining the cathode at a predetermined potential with respect to an anode in electrolytic contact therewith, such that the potential between said polarized cathode and a saturated calomel electrode brought into electrolytic contact therewith would be within the range of about 0.1 volt to about 0.15 volt with said cathode as the negative pole.

3. In the procedure for detecting the available chlorine content of an aqueous liquid by applying an external polarizing E. M. F. across electrodes electrolytically connected to one another and of which at least the cathode is exposed to said liquid, by detecting the depolarization of the polarized cathode by the liquid, the improvement by which to detect the sum of hypochlorous and chloramine chlorine while substantially inhibiting the effect on the depolarization of the cathode by substances other than available chlorine, comprising the step of maintaining the cathode at a predetermined potential with respect to its electrolytically connected anode, such that the potential between said cathode and a saturated calomel electrode brought into electrolytic contact therewith would be within the range of about 0.075 volt to about 0.2 volt with said cathode as the negative pole.

4. In the procedure for detecting changes in the available chlorine content of an aqueous liquid by the detection of changes in the depolarization of a polarized cathode, the improvement by which to detect changes in the sum of hypochlorous and chloramine chlorine while substantially inhibiting the effect on the cathode depolarization of other materials in the liquid which are likely to modify the extent of depolarization due to available chlorine, comprising the steps of applying an external polarizing E. M. F. across electrolytically connected electrodes of which at least the cathode is exposed to the liquid under test, and detecting changes in the flow of current between said electrodes as representative of changes in the depolarization of the cathode produced by changes in the available chlorine in the liquid, while maintaining between said electrodes a potential such that the potential between said cathode and a saturated calomel electrode brought into electrolytic contact therewith would be within the range of about 0.075 volt to about 0.2 volt with said cathode as the negative pole.

5. In the procedure for detecting changes in the available chlorine content of an aqueous liquid by the detection of changes in the depolarization of a polarized cathode, the improvement by which to detect changes in the sum of hypochlorous and chloramine chlorine while minimizing the effects of ammonia type materials in the liquid which cause chlorine to be present in the form of chloramines, comprising the steps of applying an external polarizing E. M. F. across electrolytically connected electrodes of which at least the cathode is exposed to the liquid under test, while maintaining between said electrodes a potential such that the potential between said cathode and a saturated calomel electrode brought into electrolytic contact therewith would be within the range of about 0.1 volt to about 0.15 volt with said cathode as the negative pole.

HENRY CLAY MARKS.